United States Patent [19]

Ikeda et al.

[11] Patent Number: 5,937,391

[45] Date of Patent: Aug. 10, 1999

[54] POINT-SERVICE SYSTEM IN ONLINE SHOPPING MALL

[75] Inventors: Sekio Ikeda; Nobuo Oka; Masao Fujiwara; Michihiro Miyasaka; Shuji Morita; Masakazu Yamashita; Yuka Egashira, all of Kawasaki, Japan

[73] Assignee: Fujitsu Limited, Kawasaki, Japan

[21] Appl. No.: 08/864,971

[22] Filed: May 29, 1997

[30] Foreign Application Priority Data

Jul. 11, 1996 [JP] Japan .................................. 8-182556

[51] Int. Cl.⁶ .................................................. B42D 15/00
[52] U.S. Cl. ............................... 705/14; 705/26; 705/27
[58] Field of Search ................................. 705/14, 26, 27, 705/29

[56] References Cited

U.S. PATENT DOCUMENTS 5,117,355   5/1992   McCarthy .
5,774,870   6/1998   Storey ........................................ 705/14

FOREIGN PATENT DOCUMENTS

| 2-34079 | 8/1990 | Japan . |
|---|---|---|
| 2 274 349 | 7/1994 | United Kingdom . |
| 2 306 740 | 5/1997 | United Kingdom . |
| 95/12175 | 5/1995 | WIPO . |

*Primary Examiner*—Thomas R. Peeso
*Attorney, Agent, or Firm*—Staas & Halsey LLP

[57] ABSTRACT

A service system in an online shopping mall established through a network realizes an improvement of a service to a customer by not having to carry a magnetic card and shortening a time from issuing points to redeeming points. To attain the objects of the system, a points issuing unit issues points corresponding to the purchase amount of a customer. A points storage device stores the number of points accumulated by the customer. A points redeeming unit reduces a purchase amount of the customer as points to be redeemed. A points issue ratio and a points redeeming ratio can be set for each shop forming part of the online shopping mall.

30 Claims, 19 Drawing Sheets

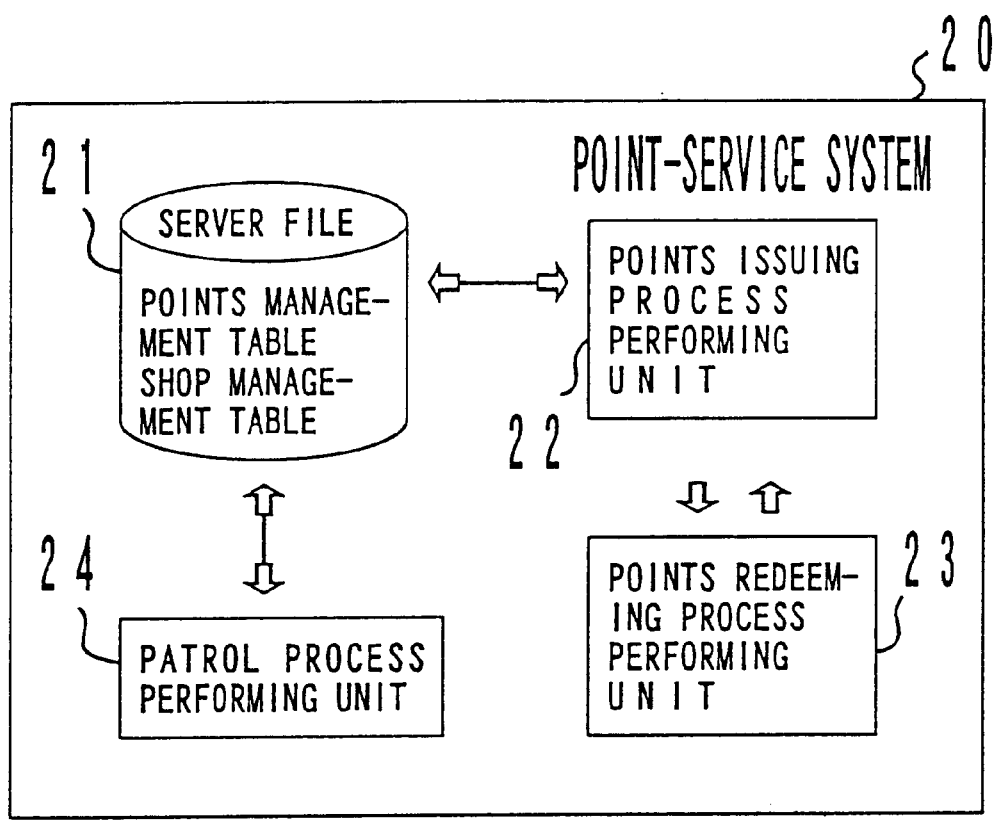
F I G. 4

FIG. 8

| CUSTOMER NAME | PURCHASE DATA | EFFECTIVE TERM | POINTS | NAME OF SHOP | EFFECTIVE FLAG | INFORMATION | MANAGEMENT TERM |
|---|---|---|---|---|---|---|---|
| a | 8/ 4/ 1<br>8/ 4/ 2<br>8/ 4/ 8<br>8/ 4/ 9<br>8/ 5/ 1 | 9/ 4/ 1<br>9/ 4/ 2<br>9/ 4/ 8<br>9/ 4/ 9<br>9/ 5/ 1 | 200<br>30<br>100<br>30<br>70 | B<br>D<br>B<br>B<br>B | 1<br>1<br>1<br>1<br>0 | 9,000 | 14/ 4/ 1<br>14/ 4/ 2<br>14/ 4/ 8<br>14/ 4/ 9<br>14/ 5/ 1 |
| b | 8/ 4/ 2<br>8/ 5/ 2 | 9/ 4/ 2<br>9/ 5/ 2 | 200<br>50 | A<br>A | 1<br>0 | 9,000 | 14/ 4/ 2<br>14/ 5/ 2 |
| c | 8/ 4/10 | 9/ 4/10 | 650 | C | 1 | 9,000 | 14/ 4/10 |

| NAME OF SHOP | POINTS ISSUE RATIO | POINTS REDEEMING RATIO | SPECIAL SERVICE START AND END | | PREMIUM POINTS RATIO | |
|---|---|---|---|---|---|---|
| A | 100 | 1 | | | 10,000 | 2 |
| B | 100 | 1 | | | 10,000 | 2 |
| C | 100 | 1 | | | 10,000 | 2 |
| D | 100 | 1 | | | 10,000 | 2 |
| E | 0 | 0 | | | 0 | 0 |
| F | 50 | 2 | 960101 | 960630 | 10,000 | 2 |
| G | 100 | 1 | | | 10,000 | 2 |
| H | 100 | 1 | | | 10,000 | 2 |

FIG. 9

```
<HTML>
<HEAD>
<TITLE>GOODS LIST</TITLE>
</HEAD>
 ・・・ <BR>
 ・・・ <BR>
 ・・・ <BR>
 ・・・ <BR>
 ・・・ <BR>
<FORM METHOD=POST ACTION=http://www.mall.aaa.co.jp/cgi-bin/program-a>
<INPUT TYPE="hidden" NAME="personal-ID" CHECKED VALUE="aaa0001">
<INPUT TYPE="hidden" NAME="store-ID" CHECKED VALUE="SPACE DEVELOPMENT">

<INPUT TYPE="checkbox" NAME="prd1">
 SPACE SUIT <INPUT TYPE="text" NAME=prd1-num SIZE="2"> <BR>
<INPUT TYPE="checkbox" NAME="prd2">
 SPACE FOOD <INPUT TYPE="text" NAME=prd2-num SIZE="2"> <BR>
<INPUT TYPE="checkbox" NAME="prd3">
 SPACE SHIP <INPUT TYPE="text" NAME=prd3-num SIZE="2"> <BR>
<INPUT TYPE="submit" VALUE="SHOPPING">
<INPUT TYPE="reset" VALUE="STOP">
</FORM>
 ・・・ <BR>
 ・・・ <BR>
 ・・・ <BR>
```

FIG. 12

| NAME OF SHOP | PURCHASE AT SPECIFIC SHOP AND USE POINTS OF ANOTHER SHOP FOR REDEMPTION(X) | PURCHASE AT ANOTHER SHOP AND USE POINTS OF SPECIFIC SHOP FOR REDEMPTION(Y) | (X)-(Y) |
|---|---|---|---|
| A | 2 0 0 | 7 2 5 | − 5 2 5 |
| B | 5 0 0 | 0 | 5 0 0 |
| C | 0 | 5 0 0 | − 5 0 0 |
| c | 0 | 0 | 0 |
| E | 0 | 0 | 0 |
| F | 8 0 5 | 1, 4 2 5 | − 6 2 0 |
| ... | ... | ... | |
| TOTAL | 4 8, 5 2 5 | 4 8, 5 2 5 | 0 |

TOTAL AMOUNTS SHOULD MATCH EACH OTHER

ADJUSTMENT AT END OF MONTH
PLUS ⟶ RECEIVABLE
MINUS ⟶ PAYABLE

POINT-SERVICE SYSTEM IN ONLINE SHOPPING MALL

BACKGROUND OF THE INVENTION

1. Field of the Invention

The present invention relates to a point-service system for realizing a point-service as a sales promotion service for transaction in an online shopping mall established in a network.

2. Description of the Related Art

One of the most popular customer lock-in systems and sales promotion systems in shopping malls is a stamp service system. A stamp service is provided by issuing a coupon corresponding to a sales amount and presenting a customer with an awarding gift, etc. when the number of coupons reaches a predetermined value.

Another popular system is to issue a magnetic card to a customer without a paper coupon, and update the service points of the customer recorded on the magnetic card each time the customer purchases goods or is presented with a discount or an awarding gift.

In this system, the magnetic card not only records the number of service points but also functions as an ID card (a unique number assigned to a customer). Regardless of using a coupon or a card, the system is operated with the conditions for issuing a coupon or any other points issue condition (hereinafter referred to as a points issue or points award ratio corresponding to the sales amount), and the conditions for redeeming points (hereinafter referred to as a points redeeming ratio) defined as common to all shops in a shopping mall. The redemption of the points means to redeem the points for discount, refund or an awarding gift. The above described systems are adopted by a number of shopping malls such as local shopping malls near stations, the Ginza Shopping Mall, etc.

Recently, customers buy goods not only in shops but also through network services using telephones, personal computers, etc. Furthermore, goods can be displayed through a network, for example, on a customer terminal connected to, for example, the Internet, so that a customer can do shopping through the terminal. When goods in a plurality of shops are displayed on the screen, the shopping mall formed of such shops is referred to as an online shopping mall. In such online shopping malls, no points services have been provided for a purchase in a shop.

In the stamp service in which the above described coupon, etc. is used, the customer has a lot of trouble in applying coupons to a brochure, storing a number of stamps, etc. The shops also have the problem that they have to prepare a number of coupons and pay for the coupons, and have a lot of trouble in following the necessary procedure for issuing the coupons and in counting the number of coupons corresponding to the sales amount for each customer, each time he or she buys goods.

To solve those problems, a point-service system has been developed using a point-of-sale terminal. In this system, service points are accumulated by a host system through the POS terminal each time a customer pays for goods. For example, the number of service points recorded on the magnetic card shown by the customer is updated.

However, in the point-service system using such a magnetic card, the customer has the problem that he or she has to necessarily show the magnetic card when he or she buy goods. Furthermore, the counting adjustment between a points issuing shop and a points redeeming shop is performed in a nighttime batch process through the host center, even if the accumulation result of the service points is recorded on the magnetic card. Therefore, the points record is not practically updated before the day after the shopping. Accordingly, it is inconvenient when exchanging the points for an awarding gift, and it takes a long time to adjust the records between a points issuing or award shop and a points redeeming shop.

SUMMARY OF THE INVENTION

The present invention aims at realizing a point-service system in an online shopping mall established through a network to solve the above described problems by, for example, eliminating the necessity for a customer to carry his or her own magnetic card, improving the quality of the service for customers by shortening the time required from the issuance of points to the redemption of the points. Furthermore, the present invention aims at activating sales in the online shopping mall, improving the quality of the services for customers, and realizing an attractive online shopping mall crowded with customers by, for example, altering the points issue ratio or the points redeeming ratio at each shop or in a specific season.

The point-service system in an online shopping mall according to the present invention includes, as basic components to realize the above listed aims, a points issuing or award unit, a points management device, and a points redeeming unit.

The points issuing unit issues points based on the purchase amount of a customer at an online shopping mall. The points issuing unit issues points according to input information such as the name of the shop and the purchase amount, based on, for example, the points issue ratio set for each shop. The points issue ratio indicates, for example, how many points are issued in return for a purchase of 100 yen. The points issue ratio can be set to a value larger than a normal value, in a special campaign period such as an end-of-year sales period.

The points management device stores, for each points issuing shop, the number of points accumulated by each customer in the format of, for example, a points management table.

The points redeeming unit performs a points redeeming process, that is, reduces the purchase amount for a customer based on the number of accumulated points. In this process, the purchase amount of the customer is reduced depending on the points redeeming ratio determined for each shopping mall or shop. Like the points issue ratio, the points redeeming ratio for a specific service period can be set to a value higher than a normal period.

When a customer decides to buy goods through a home page of an online shopping mall according to the present invention, the number of effective accumulated points of the customer issued by a number of shops to the customer is displayed on the customers terminal by referring to the data of each shop forming part of the online shopping mall. If the customer selects a shop on the display screen and clicks a shopping button, then an order input screen is displayed and the customer inputs order data on the order input screen. Then, the customer clicks the order button, and the point-service system linked to the Web server of the online shopping mall is activated to issue points or redeems points at the instruction of the customer when he or she inputs an order.

Thus, the above described aims can be attained according to the present invention by realizing the point-service system in an online shopping mall established through a network.

BRIEF DESCRIPTION OF THE DRAWINGS

FIG. 4 is a block diagram showing the configuration of the point-service system realized in an online shopping mall;

FIG. 8 shows an example of a points management table;

FIG. 9 shows an example of a shop management table;

FIG. 12 shows HTTP data, based on which the display screen shown in FIG. 11 is generated;

FIG. 16 shows an example of an adjustment redeeming points storage table;

FIG. 18 shows an example of an input screen for use in amending the contents of a shop management table.

DESCRIPTION OF THE PREFERRED EMBODIMENTS

Figure 1:
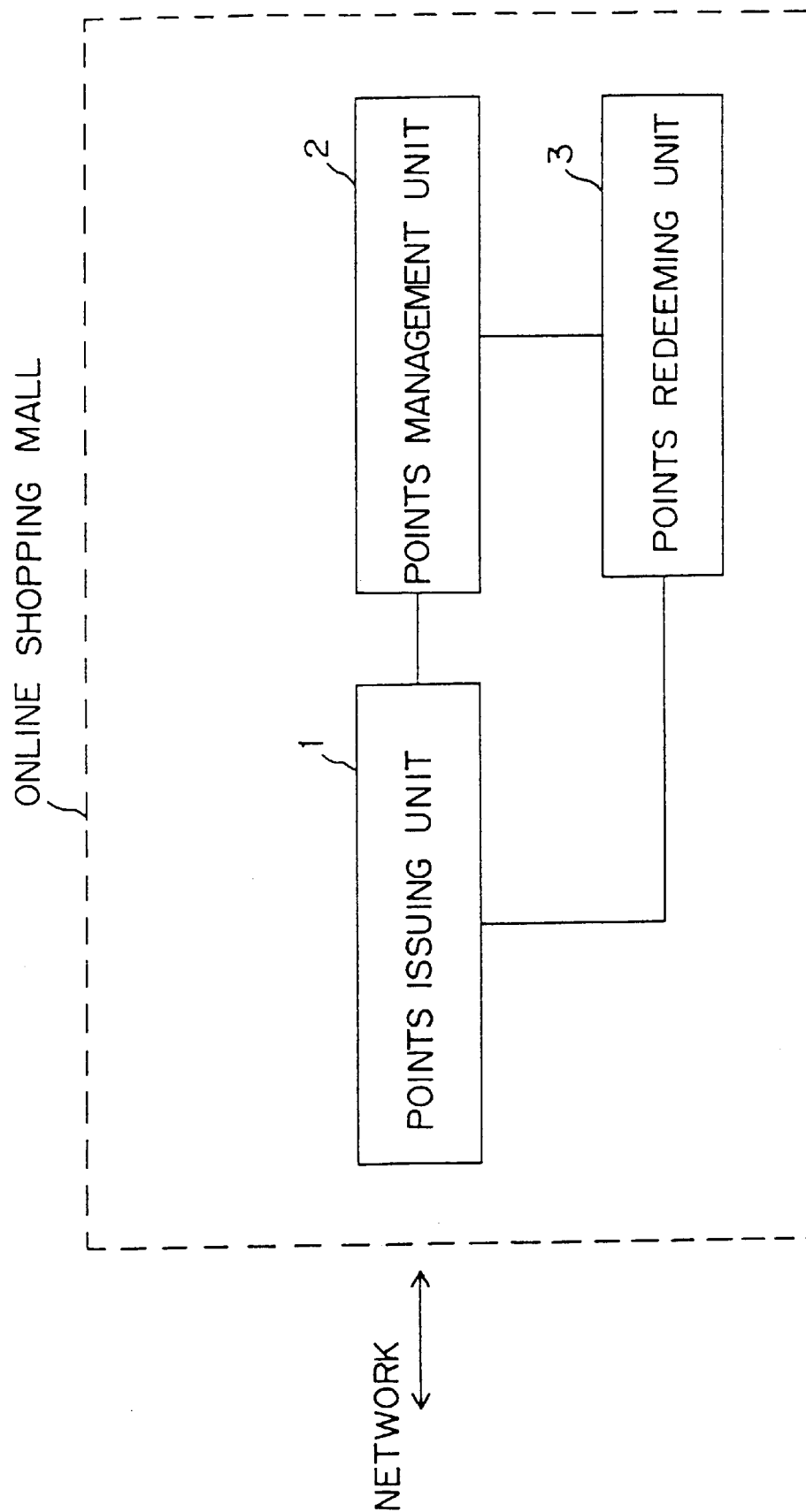
FIG. 1 is a block diagram showing the principle of the present invention.

FIG. 1 is a block diagram showing the principle of the point-service system in an online shopping mall according to the present invention. FIG. 1 shows the principle of the point-service system in the online shopping mall established through a network, for example, the Internet. The online shopping mall is assumed to be provided by a specific server, for example, a Web server in the Internet system.

In FIG. 1, a points issuing unit 1 issues points based on the purchase amount of a customer. The points issuing unit 1 issues points according to input information such as the name of the shop and the purchase amount, based on, for example, the points issue ratio set for each shop. The points issue ratio indicates, for example, how many points are issued in return for a purchase of 100 yen.

The points management device 2 stores, for each points issuing shop, the number of points accumulated by each customer.

The points redeeming unit 3 performs a points redeeming process, that is, reduces the purchase amount of a customer based on the number of accumulated points. In this process, the purchase amount of the customer is reduced depending on the points redeeming ratio determined for each shopping mall or shop.

Described below is a practical operation according to the present invention.

For example, a customer opens a home page of the online shopping mall using a URL. Then, a shopping mall entered in the data base linked to the home page of the online shopping mall is displayed. For example, a hyper link or an image map of a jewelry shop, an apparel shop, a grocery shop, etc. is displayed. If a customer clicks the mouse on the hyper link to his or her favorite shop, then the names of the goods and their images and prices of the shop are displayed on the screen. A purchasing operation is performed by clicking with the mouse for the selected goods. The goods are directly sent from the shop to the customer, and the customer makes a payment.

When each shop joins the online shopping mall, it is displayed on the home page of the online shopping mall that each shop can be provided with a point-service.

If a customer wants to buy apparel, the customer is more likely to buy the goods in an online shopping mall which allows a point-service. Each shop has also the advantage of providing a point-service. Furthermore, entering in the online shopping mall is a useful advertisement. The service provider who generates an online shopping mall on a home page can get from a subscriber a member charge or commission based on the purchase amounts.

When a customer wants to buy goods in an online shopping mall, the customer has to perform an entry operation. In the database of the online shopping mall, the customer is assigned a customer area, a customer ID, and a customer password. The customer ID is fixed for each customer, but the customer password can be optionally reset by the customer.

The customer can access the online shopping mall to check his or her number of points and purchase history. If the customer is assigned an electronic mail (e-mail) address, then the current number of points can be periodically transmitted from the online shopping mall to the customer.

Described below by referring to the attached drawings are the embodiments of the present invention.

Figure 2:
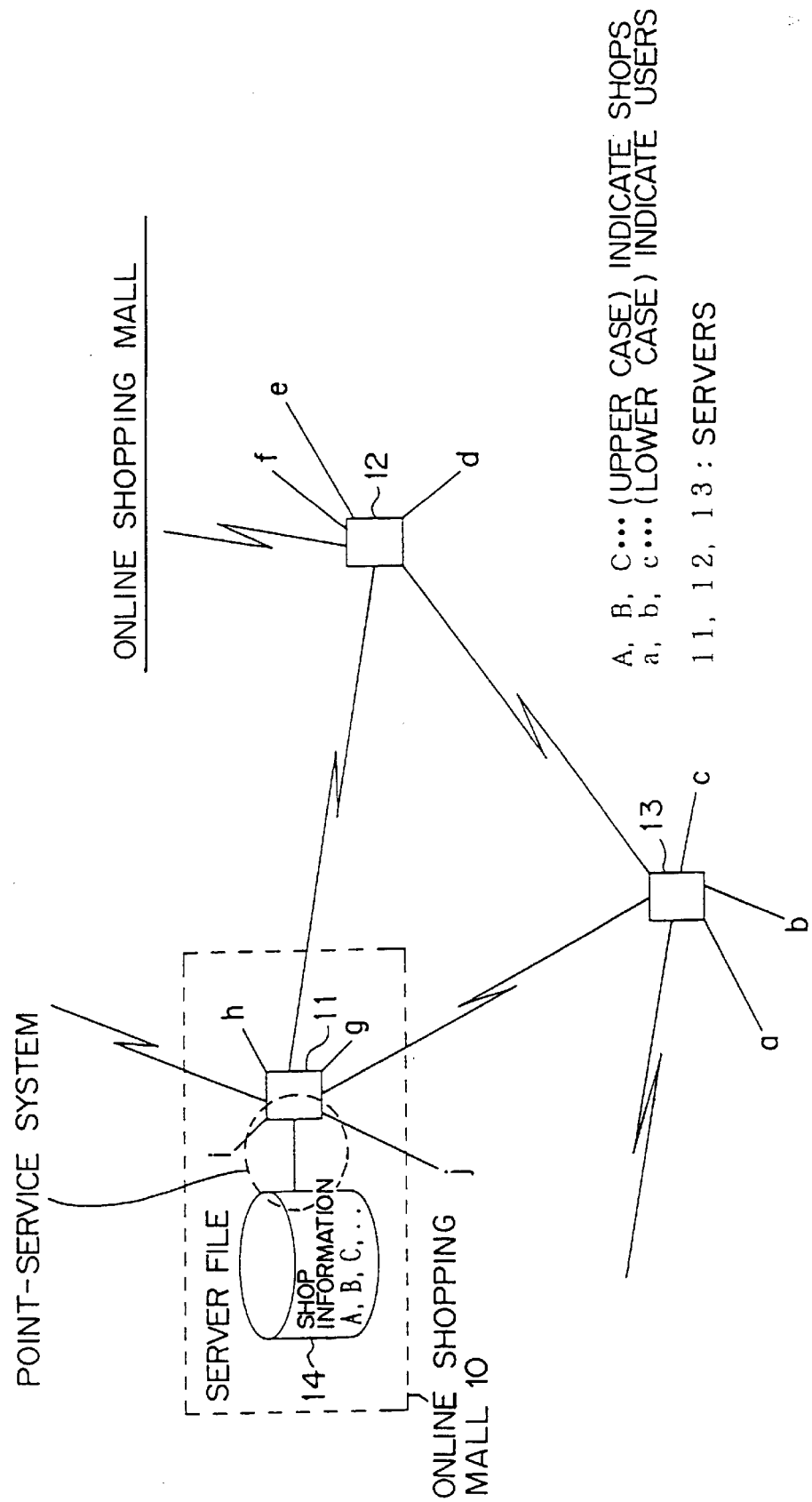
FIG. 2 shows an example of the configuration of the network for realizing the point-service system according to the present invention.

FIG. 2 shows an example of the configuration of the network for realizing a point-service system in an online shopping mall 10 according to the present invention. In FIG. 2, a plurality of servers 11, 12, and 13 form a network, for example, the Internet. For example, the server 11, that is, a Web server, provides the online shopping mall 10. A server file 14 for storing a points management table and a shop management table, to be described later, for storing the points data and shop data in the point-service system, is connected to the server 11. For example, the server 12 is connected to a conventional online shopping mall through a network. Customers d, e, and f use the server 12, and can access the conventional online shopping mall or the online shopping mall 10 having the point-service system according to the present invention. The online shopping mall 10 is assumed to comprise the shops A, B, and C. In this example, the point-service system is described by referring to an example in which the shops do not have their own servers. However, the shops can also have their own servers, and can simultaneously enter another online shopping mall.

Figure 3:
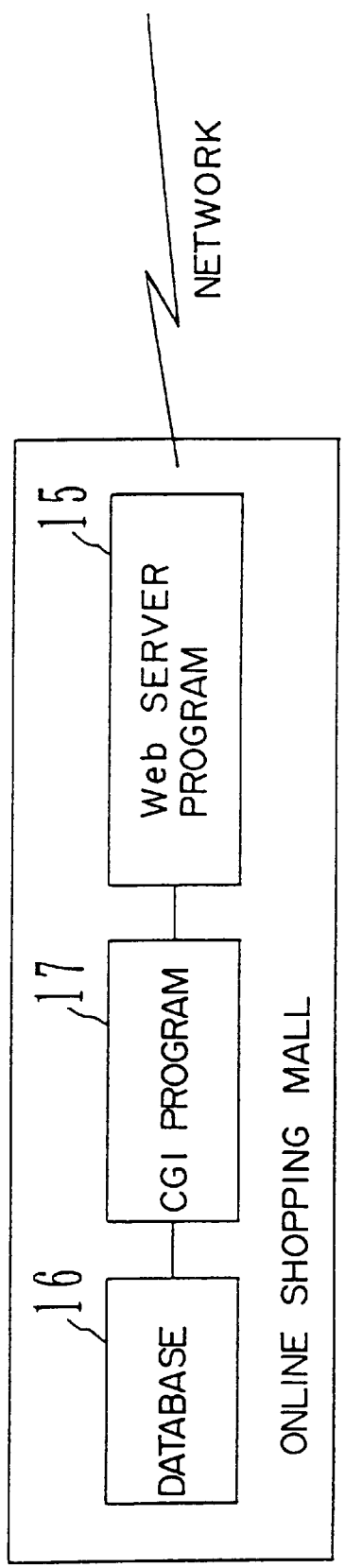
FIG. 3 is a block diagram showing the configuration of the system of the online shopping mall realized through the Internet.

FIG. 3 is a block diagram showing the configuration of the system of an online shopping mall for realizing the present invention through a network. In FIG. 3, the online shopping mall comprises a Web server program 15 in the Internet; a database 16, corresponding to the server file 14 shown in FIG. 2, for storing data of a points management table, a shop management table, etc., to be described later; and a common gateway interface (CGI) program 17 as an interface program between the Web server program 15 and the database 16.

The Web server program 15 processes data based on a hyper text transfer protocol (HTTP), and transmits to a customer a hyper text markup language (HTML) file specified by the customer through a uniform resource locator (URL). The HTML file stores the URL of the related HTML file in addition to the information to be provided for the customer. When the customer specifies the URL through a customer terminal, the URL is transmitted to the Web server program 15 through the network, and the HTML file specified by the URL is transmitted to the customer.

If the URL specified by the customer is a specific type of URL, that is, the customer specifies a file in the cgi-bin directory, then the content of the file, that is, a program, is executed. The program executed in this example is the CGI program 17. The CGI program 17 issues, for example, a structured query language (SQL) as a database query language, and the database 16 is managed by a database management system (DBMS), not shown in the attached drawings.

FIG. 4 is a block diagram showing the configuration of the point-service system realized in the online shopping mall. In FIG. 4, a point-service system 20 comprises a server file 21 for storing a points management table for storing the number of points of a customer of an online shopping mall for each customer, each time points are issued to the customer, a shop management table for storing a points issue ratio and a points redeeming ratio for each shop forming part of the online shopping mall, etc.; a points issuing process performing unit 22 for issuing points each time a customer buys goods; a points redeeming process performing unit 23 for redeeming points for a customer at the request from the customer, and reducing the purchase amount for the customer; and a patrol process performing unit 24 for monitoring, for example, the term of the points assigned to the customer and notifying a customer by mail when the term of his or her points is close to expiration.

The server file 21 is set in the database 16 shown in FIG. 3. The points issuing process performing unit 22 and the points redeeming process performing unit 23 are entered in the CGI program 17 shown in FIG. 3. The patrol process performing unit 24 is entered in the CGI program 17 shown in FIG. 3 or as, for example, an independent, periodically executed program not shown in the attached drawings.

The point-service system 20 is activated by a request from the Web server program 15 shown in FIG. 3 when a customer orders goods when he or she is shopping in the online shopping mall. As described later, the point-service system 20 is activated by a program, not shown in the attached drawings, when the charge for goods is paid for by credit.

Figure 5:
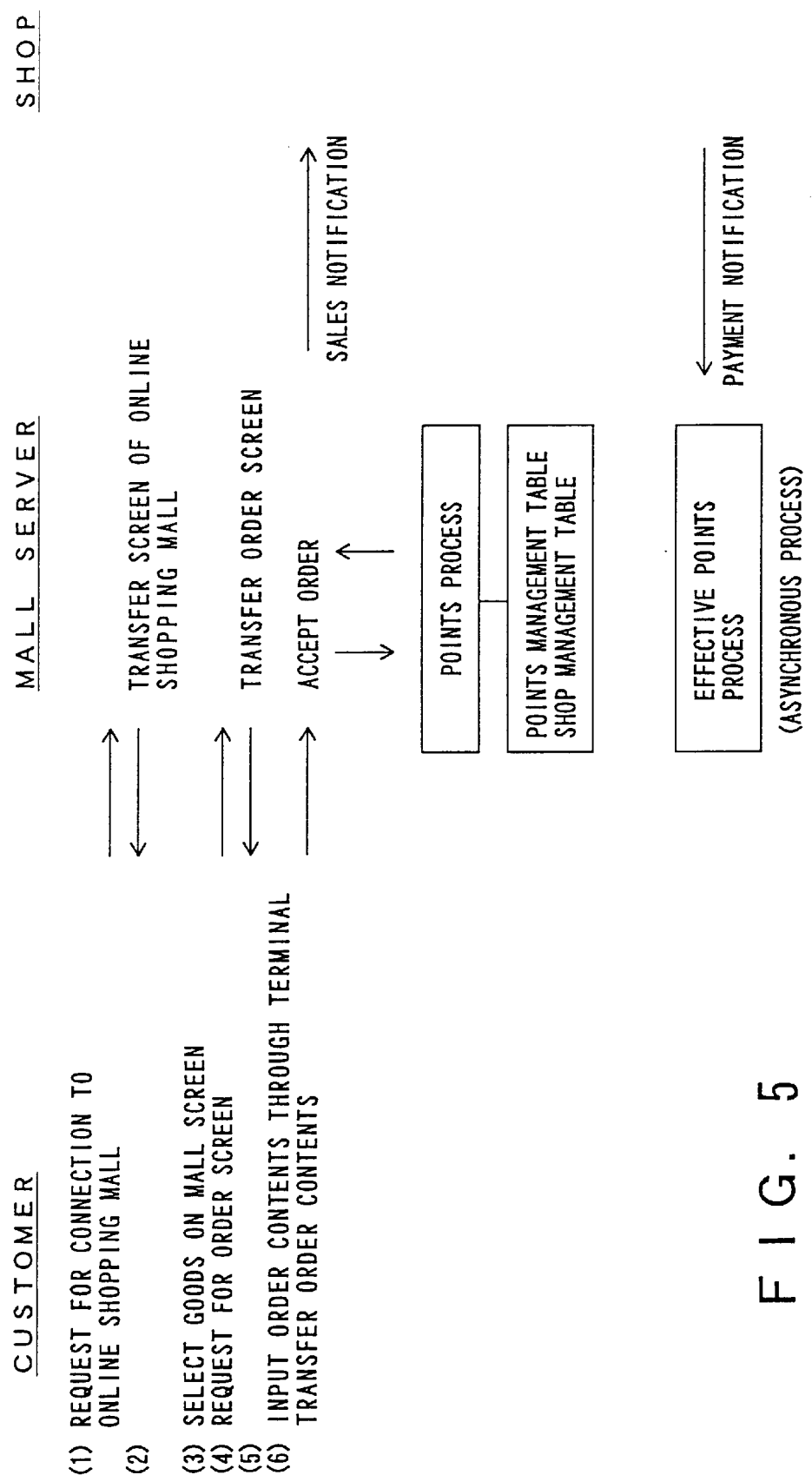
FIG. 5 shows a process flow when a customer accesses an online shopping mall.

FIG. 5 shows the flow of the processes when a customer accesses an online shopping mall (hereinafter also referred to as a mall). In FIG. 5, when the customer buys goods in an online shopping mall, 1. the customer (customer side computer) requests a server for managing a mall, that is, a mall server (FIG. 2), to connect the customer to the online shopping mall,
2. the Web server program 15 (FIG. 3) in the mall server transmits as HTTP data (HTML file) the screen data of the online shopping mall to show the data of each shop in the online shopping mall, the number of points issued by each shop to the customer, etc. in response to the request, whereas the customer displays the data on the screen based on the received HTTP data,
3. the customer optionally selects a shop on the screen,
4. the customer transmits the URL corresponding to the order screen to the mall server,
5. the mall server transmits the order screen to the customer based on the URL, and
6. when the customer inputs the order data through the terminal, the order data is transmitted to the mall server with the URL of the program for processing the order data. The mall server activates the CGI program of the URL using the received order data as a parameter. To accept the order, the activated program performs a points process, that is, a points issuing process, or a points redeeming process according to the contents of the points management table and the shop managements table, described later, and notifies the corresponding shop of the process result and the sales amount.

The effective points process shown at the bottom in FIG. 5 is a process of setting the effective flag of the points corresponding to the purchase amount to 1 when the goods have been purchased with the payment to be paid later, as described below. When the charge is actually adjusted and a payment notification is received, the effective points process in which the effective flag for a point is set to 1 is performed. This effective points process is not performed as a single process flow such as an order process, but is an asynchronous process to be performed each time a payment notification is received.

Figure 6:
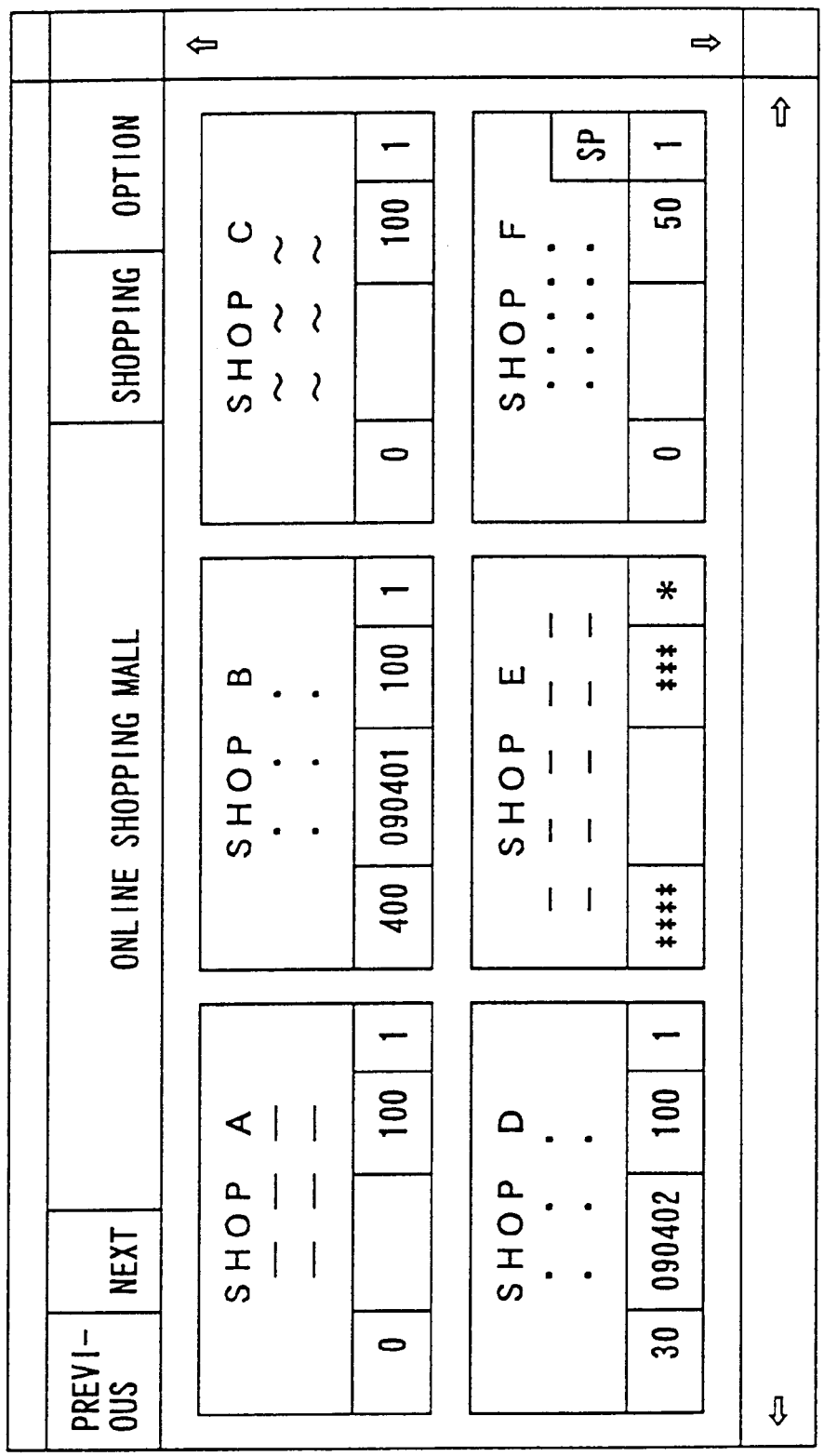
FIG. 6 shows an example of a display screen of an online shopping mall transmitted from a mall server to a customer.

FIG. 6 shows an example of the display screen (home page) of the online shopping mall transmitted from the mall server to the customer in step 2 shown in FIG. 5. FIG. 6 shows the data of the goods, prices, advertisement of each shop forming part of the online shopping mall; the number of points issued to and currently accumulated by a customer; the nearest expiring term of the points held by the customer, that is, the oldest effective term of the points among all the points accumulated by the customer; and the points issue ratio and the points redeeming ratio for each shop.

For example, 400 is the number of the accumulated points for shop B. 090401 indicates that the oldest effective term of the accumulated points is Apr. 1, 1997. As shown in FIG. 9, the points issue ratio is 100, and the points redeeming ratio is 1. The SP for shop F indicates that shop F is in a special service period. The *** for shop E indicates that shop E does not provide a point-service to customers. When all shop data cannot be displayed on the screen at once, the data is scrolled to display the remaining data of the shops. If there is a great number of shops, it is convenient for a customer to display the shop data in order from the shop for which the customer has accumulated the largest number of points.

When the customer optionally selects a shop as shown in FIG. 6 and clicks the shopping button, control is passed to step 4 shown in FIG. 5, and the order screen is transmitted from the mall server in step 5.

Figure 7:
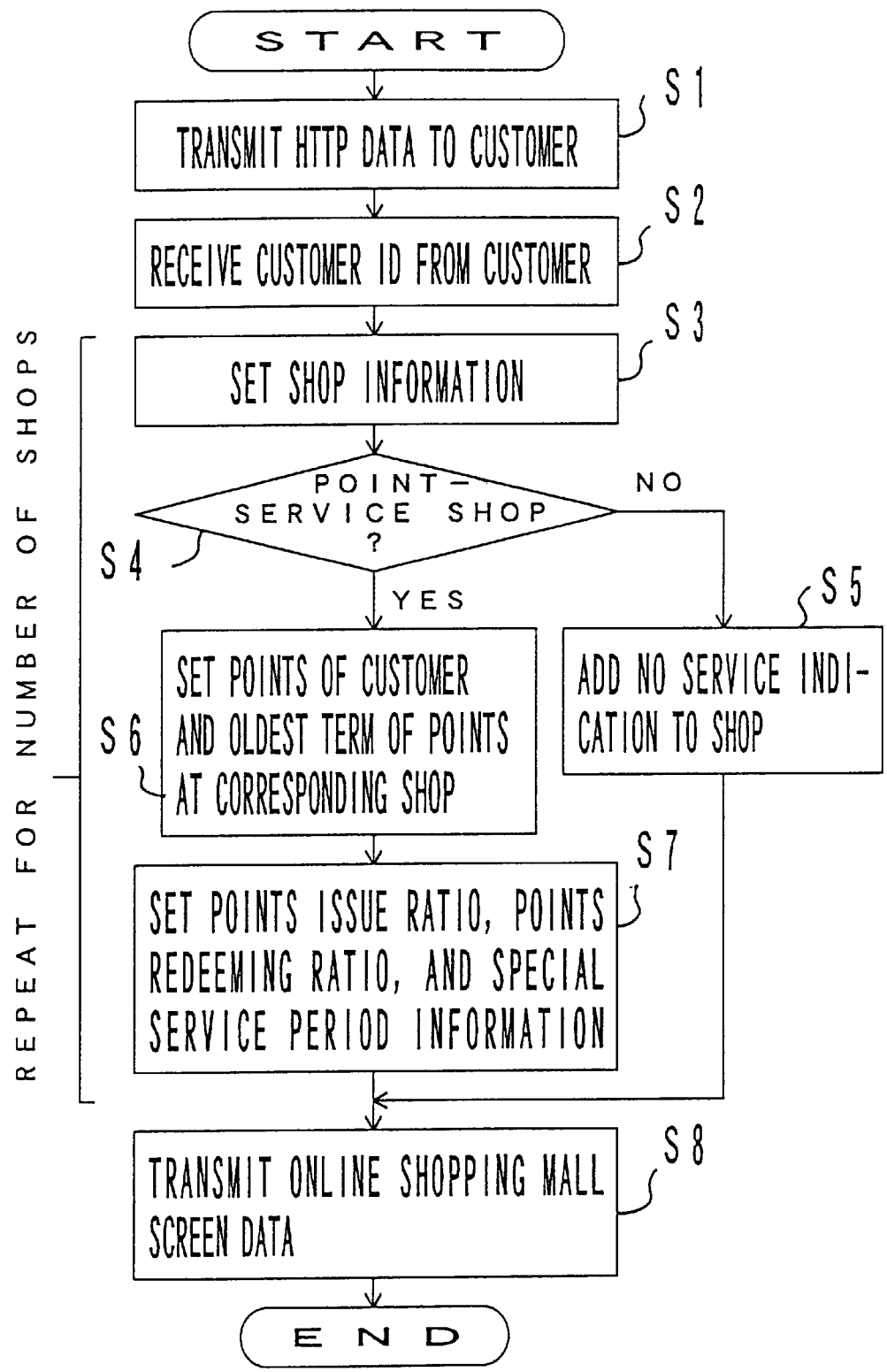
FIG. 7 is a flowchart showing the process of generating screen data for an online shopping mall transmitted to a customer.

FIG. 7 is a flowchart showing the process of generating online shopping mall screen data which is generated by a mall server, in response to a connection request issued in step 1 from the customer shown in FIG. 5 to the online shopping mall. The generated data is to be transmitted to the customer. This process flow corresponds to a part of the CGI program 17 shown in FIG. 3. When the process starts as shown in FIG. 7, the mall server transmits to the customer the HTTP data to prompt the customer to input the customer ID in step S1. When the customer inputs a customer ID through a customer terminal, the ID is transmitted to the server in step S2 together with the URL of the program which generates the screen. The URL of the program which generates the screen is contained in the HTTP data transmitted in step S1 from the server to the customer.

Then, the processes in steps S3 through S7 are repeated for each shop forming part of the online shopping mall. First, in step S3, the shop information about the goods, prices, advertisement of the shop, etc. is set up. In step S4, it is judged whether or not the shop provides a point-service. If not, it is informed in step S5 that no point-services are provided by the shop, and the process terminates for that shop. Then, the processes in and after step S3 are repeated for other shops.

If it is determined in step S4 that the shop provides a point-service, then the contents of the points management table shown in FIG. 8 are referred to in step S6, and the number of points accumulated by the customer and the oldest effective term of the points for the shop are set up.

FIG. 8 shows an example of the points management table. As shown in FIG. 8, the table stores the number of points for each customer of the online shopping mall, for each shop which provides a point-service. That is, each time points are issued, the issue date (purchase date), effective term, number of points, issuing shop (where the customer buys the goods), and the value of the effective flag are stored. If the effective flag is set to 0, it indicates that the goods have been purchased and the charge has not been paid yet, that is, the charge is to be paid later, for example, on credit, transfer from the account of the customer, transfer to the account of the shop, etc., as described later.

If the charge is to be paid later, the effective flag turns to 1 when the payment is actually made, as described later. In addition to the method of controlling the effectiveness of the points using the effective flag, a method of computing the points again after the payment is actually made can also be adopted. These methods are adopted to avoid the problem that points are issued against a purchase for which no payment is made (ineffective purchase). Issuing points immediately after receiving a purchase order, at the risk of the shop, can also be adopted, as a practical method.

The number of points in the INFORMATION column shown in FIG. 8 indicates the number of points informed to the customer by mail in the patrol process, to be described later, when the total number of points reaches this value. For example, the number of points 9000 in the INFORMATION column is transmitted to the customer so that the customer can be informed that the number of his or her points is close to 10,000, which allows an increment of the points issue ratio.

According to the management term shown in FIG. 8, the points of a customer remain stored in the system without being removed from the points management table for the management term, even after the effective term of the points has passed. In the example shown in FIG. 8, one year is set from the purchase date, that is, the points issue date, to the end of the effective term, and an additional five years are set up to the end of the management term.

After the number of points accumulated by the customer is set in step S6 as shown in FIG. 7, the information about a special service period is set for each shop in step S7, the process for that shop terminates, and the processes in and after step S3 are repeated for another shop. When the processes in steps S3 through S7 are performed for all shops forming the online shopping mall, the screen data of the online shopping mall is transmitted to the customer in step S8, and the process terminates. When there is a large number of shops, the customer has to wait a long time for data transmission. Therefore, the data can be divided for transmission.

FIG. 9 shows an example of a shop management table referred to when information about a special service period is set for each shop in step S7 shown in FIG. 7. In FIG. 9, the table stores the points issue ratio, the points redeeming ratio, the starting and ending date of a special service period, and the premium points issue ratio for each shop forming part of the online shopping mall. For example, the points issue ratio 100 for shop A indicates that 1 point is issued for 100 yen. The points redeeming ratio 1 indicates that 1 yen is reduced for each point. The premium points issue ratio 10,000 2 indicates that the points issue ratio doubles when the number of accumulated points reaches 10,000. That is, when the number of accumulated points reaches 10,000, 2 points are issued for each 100 yen. The points issue ratio 0 and points redeeming ratio 0 for shop E indicates that the point-service is not provided by shop E. It is also possible to change the points issue ratio and the points redeeming ratio for a specific period only. Shop F shown in FIG. 9 sets the first half of the year 1996 (from January 1 to June 30) as a special service period in which one point is issued for each 50 yen. In shop F, the points redeeming ratio for the special service period is set to a value double the points redeeming ratio of other shops.

Figure 10:
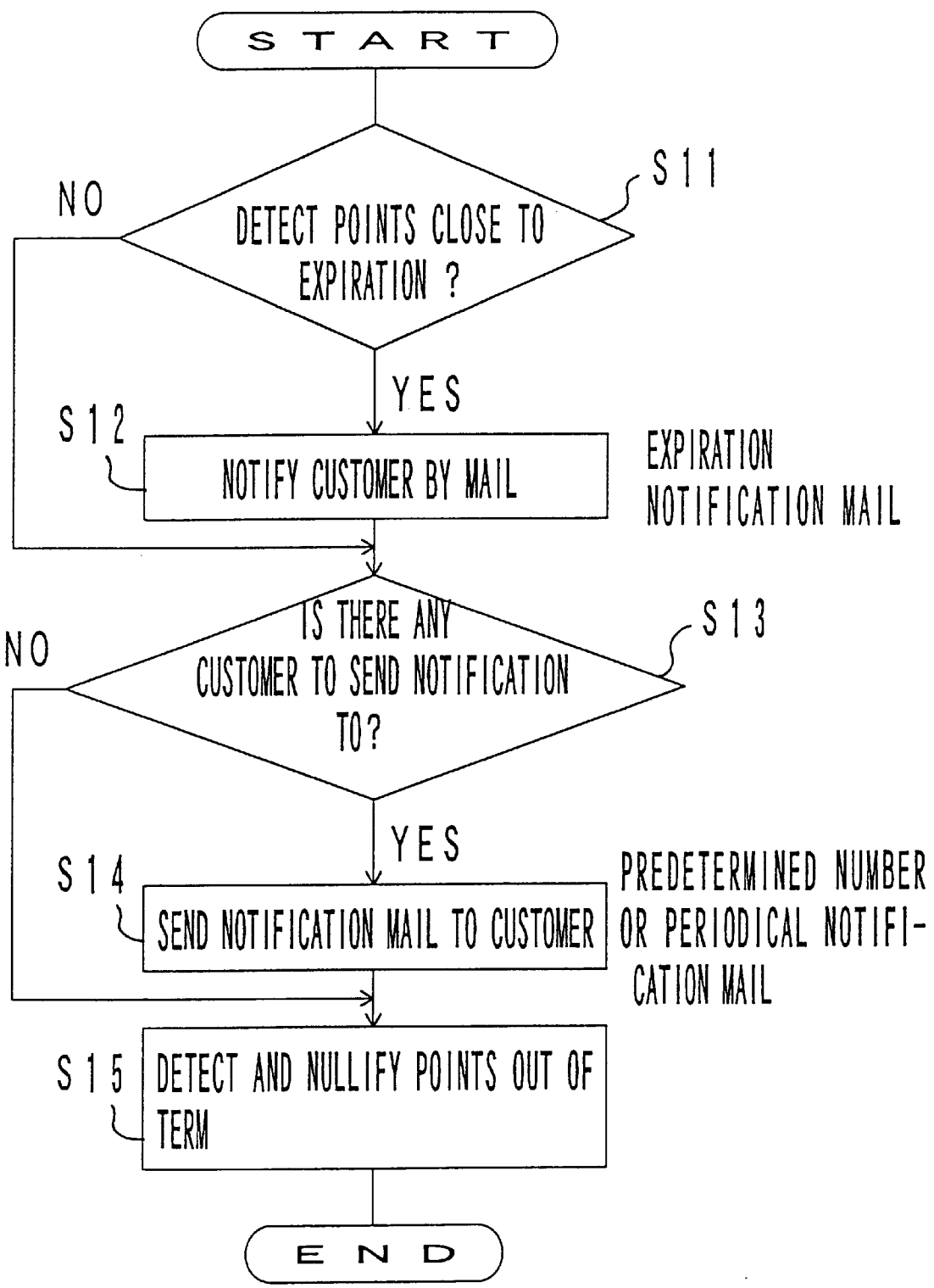
FIG. 10 is a flowchart showing a patrol process.

FIG. 10 is a flowchart showing the patrol process in which the effective term of the points stored in the points management table is confirmed. This process is periodically performed, for example, at the end of each month. When the process starts, the contents of the points management table shown in FIG. 8 are searched and it is determined whether or not there are any points which are close to expiration in step S11. If yes, control is transferred to the process in step S13 after the expiration information mail process is performed for the customer in step S12. If it is determined that there are no points close to expiration, then control is passed to the process in step S13 without performing the processes in step S12.

A mail process can be performed by either automatically sending the mail after preparing an electronic mail statement or printing a notification on a printer and normally mailing the notification. The points management table stores a mail ID required in the automatic sending process, or a postal code and address required in the normal mailing process. In any case, a mailing process is exclusively performed in step S12. It is not confirmed in step S12 whether or not a notification is actually transmitted to the customer, or whether or not the customer has actually received a notification.

In step S13, the number of points in the INFORMATION column of the points management table is compared with the sum of the number of points of each customer. Then, it is determined whether or not there is any customer to be informed of the sum. If a customer is to be periodically informed of the sum of points, it is determined whether or not there is any such customer to be informed of the sum. If there is any customer to be informed of the sum, then control is passed to the process in step S15, after a predetermined points number reaching information mail process or the periodic points number information mail process is executed in step S14 for the customer. If there is no customer to be informed of the sum, then control is passed to the process in step S15 without performing any process in step S14.

It is determined in step S15 whether or not there are points having passed their expiration date. If yes, the points are defined as invalid, thereby terminating the patrol process. When the points are nullified, it is desired that the points in the ineffective state are stored for certain period (for example, 5 years), in the points management table or an archive file, etc., because they may be required in case of any trouble, query, etc.

Figure 11:
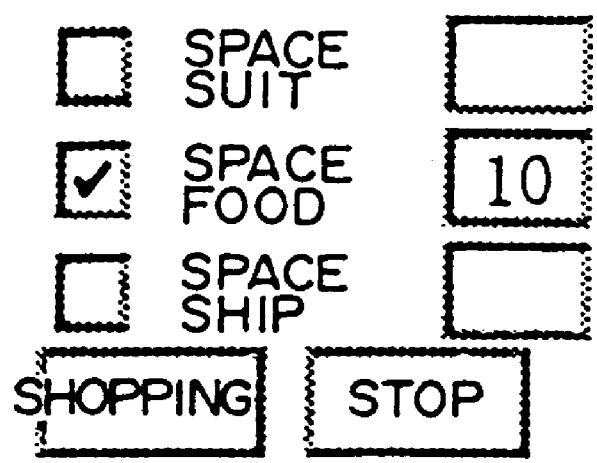
FIG. 11 shows an example of a shopping input screen displayed after a customer has optionally selected a shop.

FIG. 11 shows a shopping input screen displayed after a customer optionally selects a shop on the screen shown in FIG. 6. FIG. 12 shows the HTTP data for use in displaying an input screen. The HTTP data of the input screen contains the customer ID input by the customer on the initial screen of an online shopping mall and the identification information about the shops. That is, '<FORM METHOD=POST ACTION=http://www.mall.aaa.co.jp/cgi-bin/program-a>' shown in FIG. 12 indicates that the customer requests the server www.mall.aaa.co.jp to execute program-a after the data is input on the input screen. Furthermore, <INPUT TYPE="hidden"NAME="personal-ID" CHECKED VALUE="aaa0001"> defines an object to be transmitted as a parameter when program-a is executed at the request. That is, it is defined that the data personal-ID=aaa0001 (indicating that the customer ID is aaa0001) is to be transmitted. The 'INPUT TYPE="hidden" indicates that the data is not displayed. Similarly, <INPUT TYPE="hidden" NAME="store-ID" CHECKED VALUE="SPACE DEVELOPMENT"> defines an object to be transmitted as a parameter when program-a is executed at the request. That is, it is defined that the data store-ID=SPACE DEVELOPMENT (indicating that the name of the shop is space development) is to be transmitted. The 'INPUT TYPE="hidden" indicates that the data is not displayed.

<INPUT TYPE="checkbox" NAME="prdl"> defines that the data prdl=yes (indicating that the goods prdl is purchased) is to be transmitted to the mall server when a check box is displayed on the screen and clicked. The subsequent 'SPACE SUIT' indicates that the character string 'SPACE SUIT' is displayed on the screen. The next <INPUT TYPE="text" NAME=prdl-num SIZE="2"> indicates that a 2-byte area is displayed as an input area of the number of space suits to be purchased, and that the input data (prdl-num=number of suits) is transmitted. <BR> indicates a new line. This is also true with the 'SPACE FOOD' and the 'SPACE SHIP'. <INPUT TYPE="submit" VALUE= "shopping"> displays a 'shopping' button. When the button is clicked, the name of the program for performing the above described processes and its parameters are transmitted to the mall server. <INPUT TYPE="reset" VALUE="stop"> displays a 'stop' button. When the button is clicked, the values of the input parameters are cleared.

Figure 13:
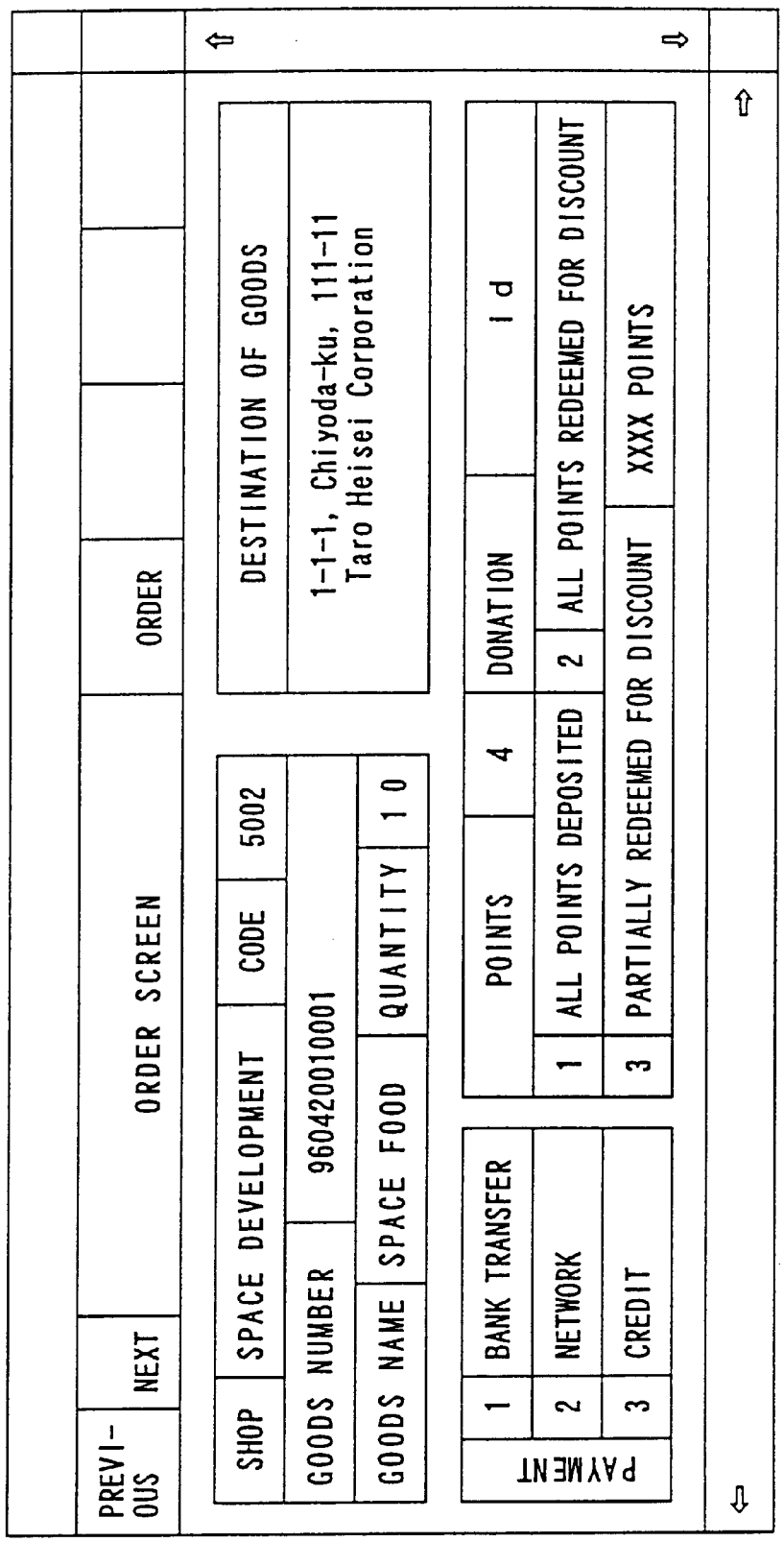
FIG. 13 shows an example of an order screen transmitted from a mall server to a customer.

FIG. 13 shows an example of an order screen transmitted from a mall server in step 5 shown in FIG. 5 by clicking the above described shopping button. The HTTP data on the order screen contains the data (the name of the goods and the quantity) input when the customer selects the goods as described above, the data (the customer ID and the name of the shop) carried over from the previous screen, and the URL of the CGI program executed corresponding to the screen.

In FIG. 13, the customer inputs a destination of the goods, etc., selects the type of payment from the three methods, that is, the bank transfer, the network money, or the payment on credit, and specifies among the accumulation of all points, or the redemption using all accumulated points, or the redemption using a part of the accumulated points, and specifies the number of points for redemption when a partial redemption of the accumulated points are specified. If the points obtained in this shopping order are donated to, for example, a charity organization, or are added as another customer's points, for example, a member of the customer's family, then the program having the URL specified in the HTTP data on the screen, that is, the point-service system 20 (shown in FIG. 4) is activated by specifying the identifier (id) of the receiver of the points and clicking the order button.

Figure 14:
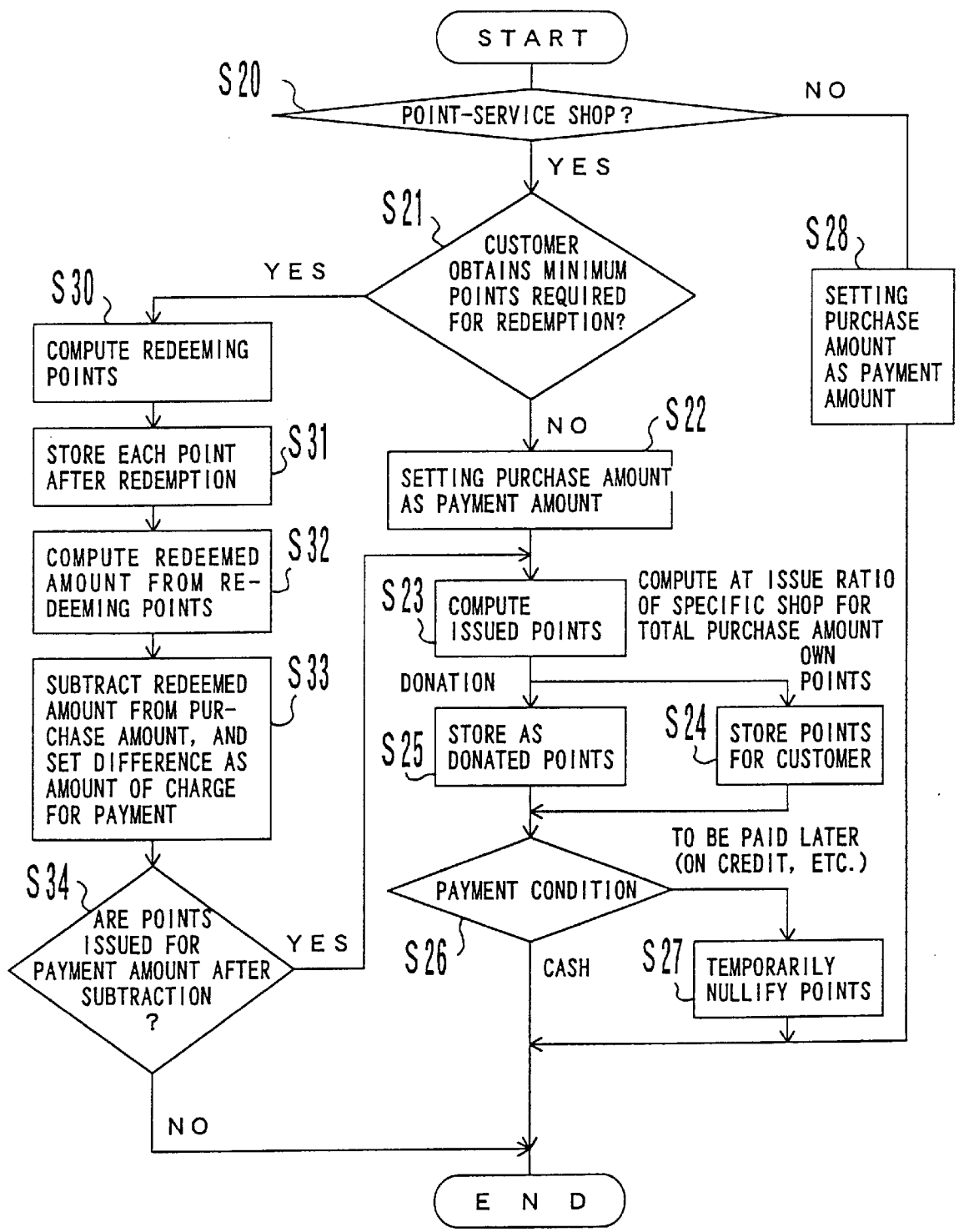
FIG. 14 is a flowchart of a points issuing process.

FIG. 14 is a flowchart showing the points issuing process activated by a customer's clicking the order button on the screen shown in FIG. 13. This process flow corresponds to the points issuing process performing unit 22 shown in FIG. 4, that is, a part of the CGI program 17 shown in FIG. 3. When the process starts as shown in FIG. 14, it is first determined in step S20 whether or not the shop in which the customer placed an order provides a point-service. If the shop does not provide the service, the purchase amount of the customer is recorded on the bill, thereby terminating the points issuing process. After the points issuing process, a normal order process and a charge billing process are performed as a part of the CGI program 17 shown in FIG. 3.

When it is determined in step S20 that the shop provides a point-service, it is determined in step S21 whether or not the customer requests a redemption using the accumulated points, and whether or not the number of the accumulated points has reached the minimum value for a redemption. Unless both of these conditions are satisfied, no redemption is made. When no redemption is made, after the purchase amount is defined as the payment amount in step S22, the number of points is computed in step S23. That is, the number of the points corresponding to the purchase amount is computed at a points issue ratio of the corresponding shop. The minimum value of the points for a redemption can be either commonly defined within an online shopping mall or individually set by each shop.

It is determined by the specification on the above described order screen shown in FIG. 13 whether or not the points are to be donated or added to another customer's points. If the points are to be counted as the customer's own points, then they are stored in the points management table as the customer's own points in step S24 with the contents from the purchase date to the effective flag appropriately set. If the points are to be donated or added to another customer's points, they are similarly stored in step S25 as the points of the donee or another customer. Then, the payment condition is determined in step S26. For example, if the points are to be added to another customer's points, it is convenient to optionally select specifying the destination of the points to be added each time the customer buys goods, and preliminarily entering the destination to automatically add his or her own points as the points for the destination.

When a payment is made in cash, for example, electronic money, electronic check, electronic draft, etc., the points issuing process terminates. When a payment is made afterwards on credit, automatic transfer from the customer's account, transfer to the account of the payee, etc., the effective flag for the points is set to 0 in step S27, the points are set to be ineffective until the payment is made, thereby terminating the process.

If a customer requests a redemption using the points accumulated by the customer, and it is determined that the number of the points has reached the minimum value for a redemption in step S21, then the redeeming points computing process is performed in step S30. This process is explained in detail by referring to FIG. 15.

After the number of points is computed for a redemption in step S30, the number of points for each shop after the number of redeeming points is subtracted is stored in the points management table in step S31. In step S32, the redemption amount is computed based on the number of the points to be processed for a redemption. In step S33, the redemption amount is subtracted from the purchase amount, and the result is defined as the payment amount. In step S34, it is determined whether or not points are to be issued for the payment amount obtained after the subtraction. For example, if the total amount after the subtraction is very small, that is, it does not reach 100 yen for one point, then no point is issued, thereby terminating the process. If the total amount after the subtraction indicates the amount for which points should be issued, then the points are issued in the processes in and after step S23.

Figure 15:
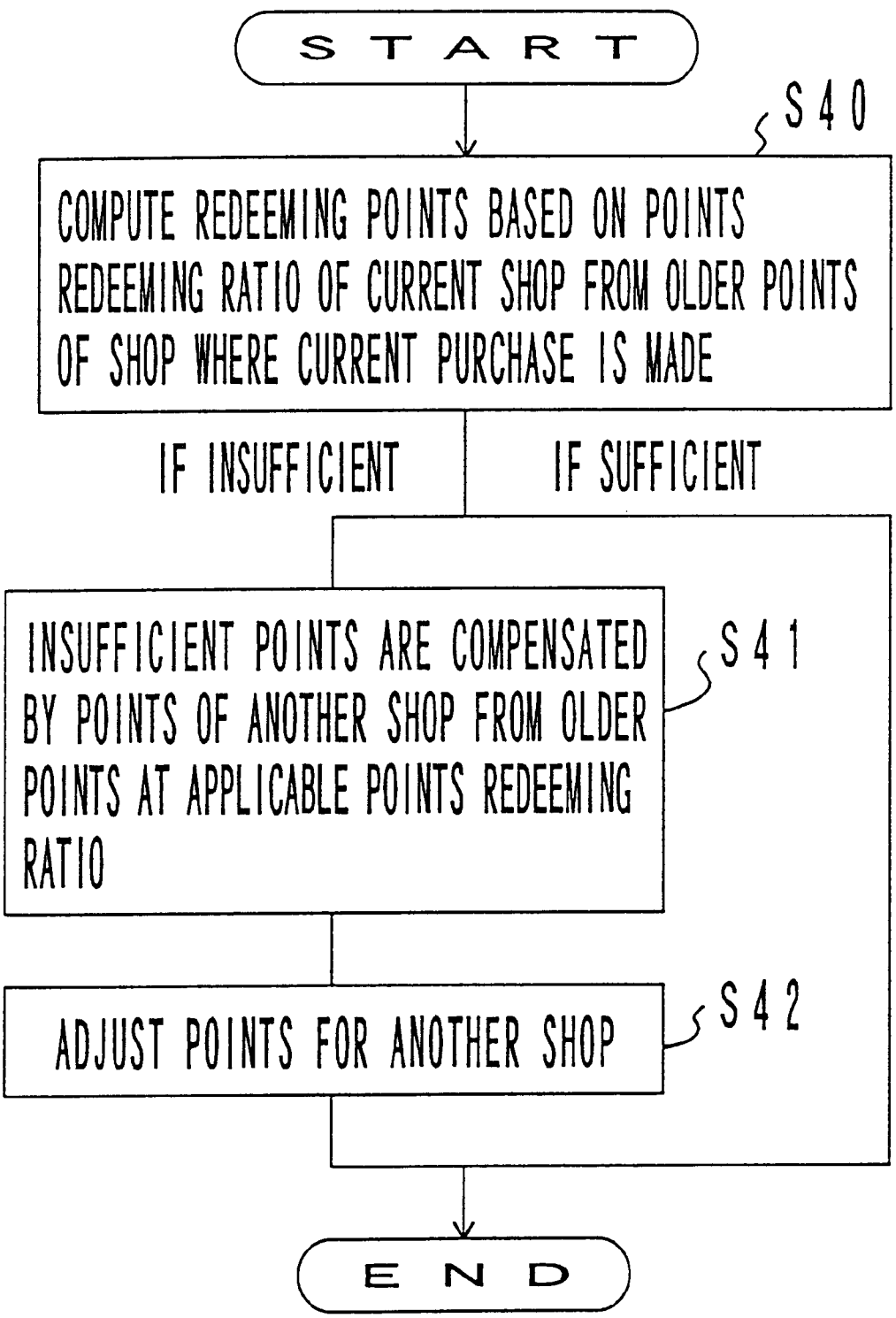
FIG. 15 is a flowchart of a points redeeming process.

FIG. 15 is a flowchart of the process in step S30 shown in FIG. 14, that is, the redeeming points computing process. The process flow corresponds to the redeeming process performing unit 23 shown in FIG. 4, that is, a program forming part of the CGI program 17. When the process starts as shown in FIG. 15, the points accumulated for the current shop, in which the customer makes a new purchase, are counted for points redemption from the oldest points in step S40, and the redeeming points are computed at the points redeeming ratio of the current shop. Then, it is determined whether or not the number of the redeeming points has reached the value specified by the customer. If yes, the process terminates because it is not necessary to use the points accumulated for other shops.

If the number of the redeeming points has not reached the value specified by the customer, then the deficit is compensated by the points accumulated for other shops from the oldest points in step S41. The redeeming points are computed at the points redeeming ratio common to all shops in the online shopping mall. Then, in step S42, the redeeming points adjusting process is performed between other shops, and the process terminates. When the points accumulated for other shops are used in redeeming points, the points redeeming ratio specifically set for the current shop, not the common ratio in the online shopping mall, can also be applied.

That is, according to the present embodiment, the points accumulated for the shop, in which the customer makes new purchase, are processed in redeeming points. The points are counted from the oldest one by priority. For example, as shown in FIG. 8, if customer A requests to redeem 250 points when he or she buys goods at shop B, then 200 points obtained when the customer bought goods on Apr. 1, 1996, are used for redeeming points, and out of 100 points obtained when the customer bought goods on Apr. 8, 1996, 50 points are used for redeeming points. The points obtained when the customer bought goods on Apr. 2, 1996 at shop D, not the present shop B, are not used in this case although the effective term of these points is older than the term of the points for shop B.

Customers can be allowed special services if they buy goods at the same shop by setting the points redeeming ratio higher than the common points redeeming ratio of the online shopping mall.

In performing the redeeming points adjusting process in step S42 shown in FIG. 15 among a plurality of shops, the adjustment is performed each time points are used for a redemption, performed collectively on all shops covering a predetermined period after storing redeeming points data for an appropriate period such as one week data, one month, etc., or performed using the amount corresponding to the redeeming points as the amount that is committed by a points issuing shop to the union of a shopping mall as a deposit.

FIG. 16 is an example of an adjustment redeeming points storage table for adjustment used in a redeeming points adjusting process periodically performed by all shops forming an online shopping mall. This table contains the cumulative values X and Y indicating the amount of redeeming points recorded for each of all shops A, B, C, D, E, F, ... forming an online shopping mall. X is the amount of the redeeming points when a customer buys goods in one shop and uses points issued by any other shop for a redemption, and Y indicates the amount of redeeming points when a customer buys goods at another shop and uses redeeming points accumulated for one shop. For example, if adjustment is performed at the end of each month, the difference between the values X and Y is computed at the end of each month. When the value is positive, the account is receivable. When the value is negative, the account is payable. For example, if a customer buys goods at shop B, and uses 200 points issued by shop B and 500 points issued by shop C for redemption, then the column X for shop B in the table contains 500 redeeming points, and the column Y for shop C contains 500 redeeming points. The column X-Y on this table indicates results of the process of the adjustment at the end of each month, that is, the state immediately after the difference between X and Y is computed.

Figure 17:
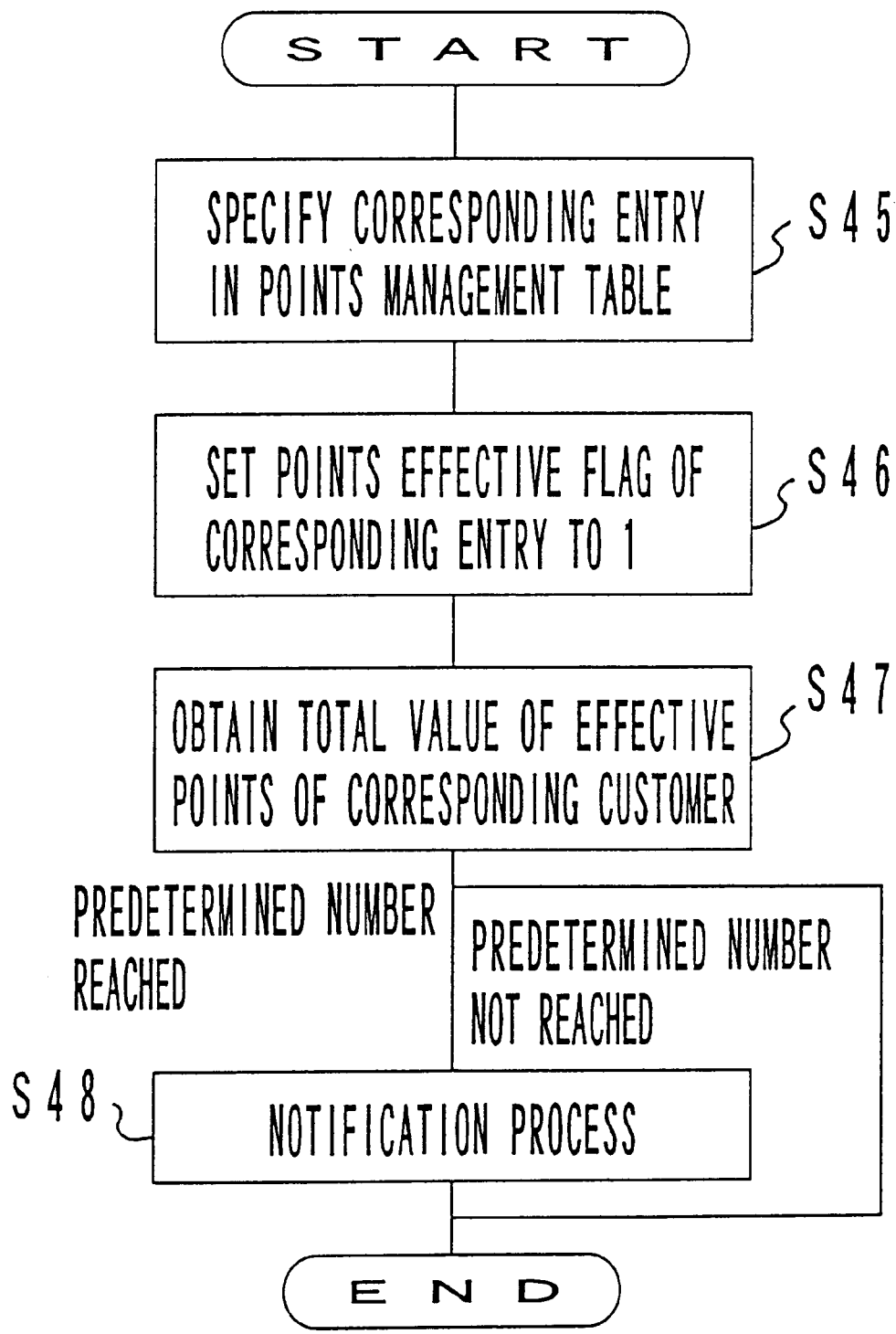
FIG. 17 is a flowchart showing the points calculation process at the time of credit payment.

FIG. 17 shows the points effectuation process at the adjustment of a charge when it is paid on credit, automatic transfer from the customer's account, transfer to the account of the payee, etc. This flow corresponds to the control program independent of the CGI program 17 shown in FIG. 3. If a customer specifies at the purchase of goods that payment is to be made afterwards, for example, on credit as described above by referring to step S27 shown in FIG. 14, then the effective flag for the issued points corresponding to the purchased goods is set to 0, and the effective flag is changed into 1 when the payment is made. In this case, a points issue ratio is obtained in step S23 as a basic concept. For example, when a customer buys goods during a year-end special service period, the special point-service is applied even if the payment is made after the period.

If a shop or a financial company, etc. transmits a payment notification to a mall server, as shown in FIG. 17, a corresponding entry in the points management table is specified in step S45, the effective points flag for the entry is set to 1 in step S46, and a total number of effective points for the customer is obtained in step S47. If the total number of the points has reached the value of the INFORMATION column of FIG. 8, then a notification mail process is performed in step S48 to inform the customer of this. If the total number of the points has not reached a predetermined value, then no process is performed and the entire process terminates. Such a points effectuation process for the payment to be made afterwards can be efficiently performed by being performed collectively. If a shop or a financial company transmit a plurality of payment notifications to a mall server, then the processes in steps S45 through S48 can be repeated.

Figure 18:
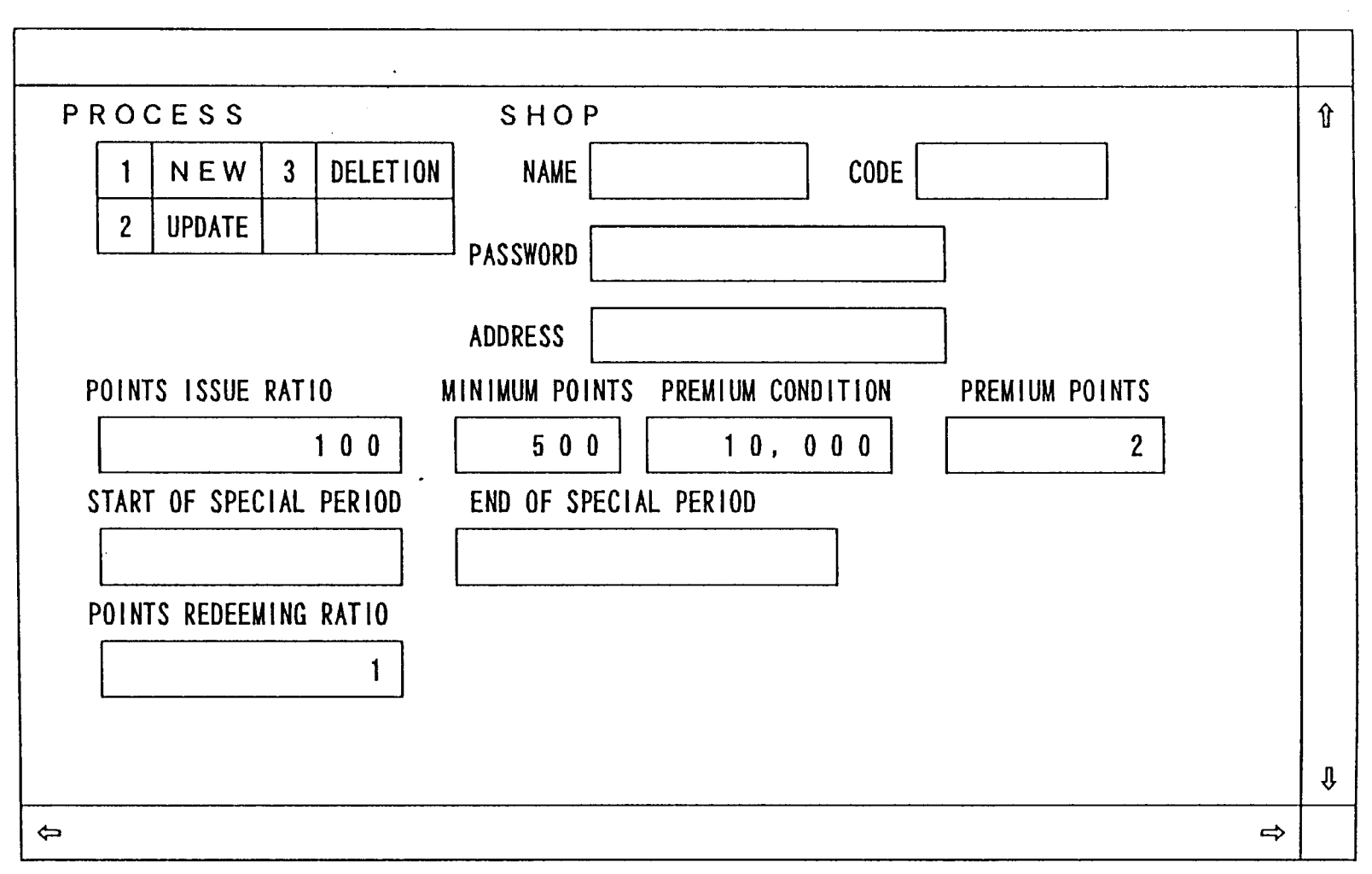

FIG. 18 shows an example of an input screen displayed when the contents of the shop management table shown in FIG. 9 are altered from the server of each shop. On such screens, the server of each shop can be newly set, and the contents of the shop management table can be altered or deleted. Since a considerable loss would be caused by a malicious alteration of the data in the shop management table, security should be provided for the authorization for access to the shop management table.

Figure 19:
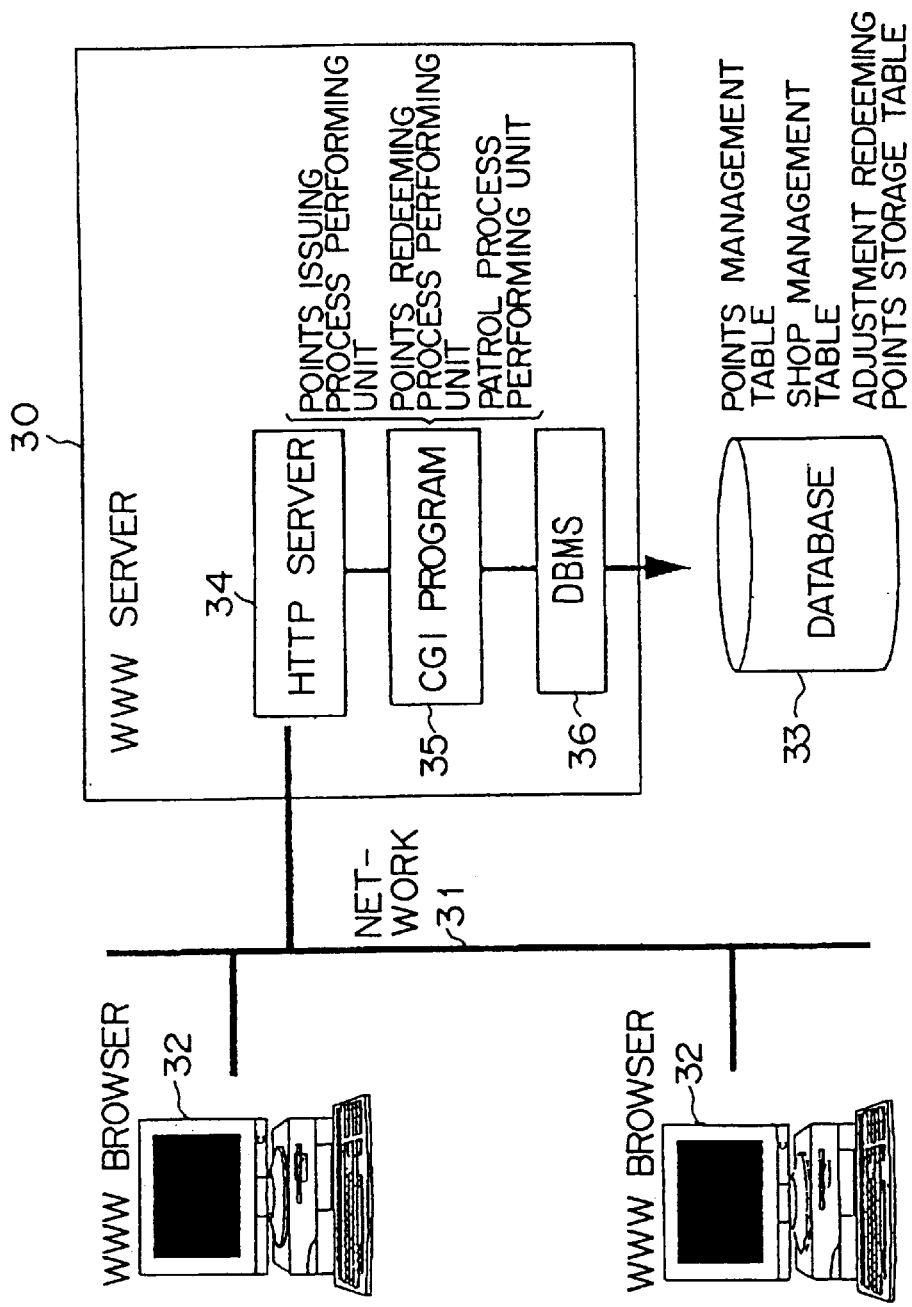
FIG. 19 shows the configuration of a practical point-service system in an online shopping mall according to the present invention.

FIG. 19 shows an example practically showing the point-service system in an online shopping mall according to the present invention as the configuration of the system in a computer environment. FIG. 19 shows the point-service system as a summary of FIGS. 2 through 4, illustrating the configuration of a WWW server 30, a network 31, a plurality of WWW browsers 32, and a database 33. The WWW server 30 comprises an HTTP server 34 for performing a process based on the above described HTTP protocol, a CGI program 35 for performing the processes of a points issuing process performing unit, a points redeeming process performing unit, and a patrol process performing unit, and a database management system (DBMS) 36. The database 33 stores a points management table, a shop management table, an adjustment redeeming points storage table, etc.

Clicking the mouse of a remote shop which is displayed in the home page of an online shopping mall, but is not entered in the online shopping mall, can access the home page of the shop. In this case, the purchase information is simultaneously input to the database linked to the home page of the online shopping mall and the database linked to the home page of the shop. If the shop enters the online shopping mall, the purchase information stored in the database linked to the home page of the shop is also transmitted to the database linked to the home page of the online shopping mall using the existing network transfer command. In this case, the customer can access the home page of the shop from the home page of the online shopping mall, enter a request to receive a point-service from the online shopping mall each time the customer buys goods in the shop, and then use the point-service system even if the customer buys goods directly through the home page of the shop. Furthermore, each shop can easily provide a customer with the latest goods in the shop by constantly updating the database linked to the home page.

As described above, the points issue ratio and the points redeeming ratio can be set as common to all shops in a shopping mall. Such points issue ratio and points redeeming ratio may be individually set by each shop in a shopping mall.

The embodiment of the present invention is described above. However, it is obvious that the present invention is not limited to this application, but can be realized in various embodiments within the scope disclosed by the specification and claims of the present invention. Especially, the goods can be the reservations of travel, hotels, theaters, etc.

As described above, the merits to the customers of the point-service system of an online shopping mall according to the present invention are that it is very convenient for a customer to buy goods through a network without a transportation fee to the shops, various services such as immediate redemption by points when the customer buys goods are provided, no cards are required when buying goods, the current number of the points can be easily computed, services can be improved for the customers through competition among the shops in the online shopping mall, etc.

The merits to the shops in the online shopping mall is that the sales amount can be increased by inviting a number of customers to the online shopping mall, it is not necessary for the shop in the online shopping mall to preliminarily buy points, the shops do not have to issue any cards, each shop can provide a customer with their own and attractive services, thereby serving to further develop the online shopping mall.

What is claimed is:

1. A point-service system for use in an online shopping mall established in a network, comprising:
   points issuing means for issuing points depending on a purchase amount of a customer and a points issue ratio defined as a number of issued points corresponding to the purchase amount of the customer;
   points management means for storing points issued by said points issuing means and accumulated by the customer;
   points redeeming means for redeeming points according to a points redeeming ratio defined as the redemption based on the number of points within a number of accumulated points of the customer stored by said points management means, and for decreasing the number of the accumulated points of the customer.

2. The point-service system according to claim 1, wherein
   said points issuing means sets the points issue ratio for each shop forming part of the online shopping mall.

3. The point-service system according to claim 1, wherein
   said points issuing means sets the points issue ratio to a value effective only in a specific period and different from a value effective in a period other than the specific period.

4. The point-service system according to claim 1, wherein
   said points issuing means sets the points issue ratio to a value depending on a number of points accumulated by the customer and not used for a redemption.

5. The point-service system according to claim 1, wherein
   when the customer buys goods with a payment made later, said points management means stores the points issued for the goods by said points issuing means as being effective for redeeming points after the payment is made.

6. The point-service system according to claim 1, wherein
   said points management means stores the points issued by said points issuing means as points accumulated by a customer other than the customer who obtained the points by buying the goods.

7. The point-service system according to claim 6, wherein
   said points management means follows a specification of the other customer from the customer who obtained the points issued by said points issuing means by buying the goods.

8. The point-service system according to claim 1, wherein
   said points redeeming means redeems points for a discount from a purchase amount according to the points redeeming ratio.

9. The point-service system according to claim 1, wherein
   said points redeeming means sets the points redeeming ratio for each shop forming part of the online shopping mall.

10. The point-service system according to claim 1, wherein
    said points redeeming means sets the points redeeming ratio to a value effective only in a specific period and different from a value effective in a period other than the specific period.

11. The point-service system according to claim 1, wherein
    said points management means stores an effective term assigned to points issued by said points issuing means; and
    said points redeeming means allows a redemption using points in effective terms only.

12. The point-service system according to claim 11, wherein
    said points redeeming means uses points of the customer from the points assigned an oldest effective term in redemption.

13. The point-service system according to claim 11, wherein
    said points management means continues storing points out of the effective terms for a predetermined period after the effective terms have passed.

14. The point-service system according to claim 1, further comprising:
points accumulation amount notification means for periodically notifying each customer of a number of accumulated points stored by said points management means.

15. The point-service system according to claim 1, further comprising:
points accumulation amount notification means for non-periodically notifying each customer of a number of accumulated points stored by said points management means.

16. The point-service system according to claim 15, wherein
said points accumulation amount notification means notifies a customer of a number of accumulated points when the number of accumulated points has reached a predetermined value.

17. The point-service system according to claim 1, wherein
said points redeeming means allows a redemption using not only a number of points issued by a specific shop, in which a customer makes a new purchase, but also a number of points issued by other shops.

18. The point-service system according to claim 17, further comprising:
inter-shop redeeming points adjusting means for adjusting redeeming points among a plurality of shops forming part of the online shopping mall based on a number of redeeming points, a name of the specific shop, and names of other shops, for points issued by the other shops in the redeeming points used by said points redeeming means when a customer buys goods at the specific shop.

19. The point-service system according to claim 18, further comprising:
an adjustment redeeming points storage table for storing, for each shop forming part of the online shopping mall, a number of points X issued by the specific shop and used for a redemption at another shop, and a number of points Y used for a redemption at a specific shop but issued by other shops, wherein
said inter-shop redeeming points adjusting means updates contents of said adjustment redeeming points storage table, when points are used for a redemption, based on a number of redeeming points, a name of a shop which issued the redeeming points, and a name of a shop at which the redemption is allowed, and adjusts the redeeming points among the plurality of shops based on a difference between said number of points X and said number of points Y.

20. The point-service system according to claim 18, wherein
said inter-shop redeeming points adjusting means periodically performs an adjusting process.

21. The point-service system according to claim 1, further comprising:
online shopping mall display control means for controlling display for each customer, when a customer is buying goods in the online shopping mall, in such a way that data of each shop forming part of the online shopping mall is displayed with a number of points unused for a redemption within points issued to each customer by a shop which provides a point-service in the online shopping mall.

22. The point-service system according to claim 21, wherein
said online shopping mall display control means controls the display of the data of each shop forming part of the online shopping mall in order from a shop having a largest number of points unused for a redemption.

23. The point-service system according to claim 1, further comprising:
online shopping mall display control means for controlling display, when the customer is buying goods in the online shopping mall, of data of each shop forming part of the online shopping mall in a format clearly indicating whether or not each shop provides a point-service.

24. A computer-readable storage medium used to direct a computer to perform, in realizing a point-service in an online shopping mall established through a network, the functions of:
issuing points depending on a purchase amount of a customer;
storing, for each customer in memory, issued points accumulated by each customer; and
reducing payment of a customer as redeeming points using the points accumulated by the customer.

25. A method of receiving a point-service in an online shopping mall established through a network, comprising the steps of:
specifying by a customer a name of a shop at which a customer is buying goods in the online shopping mall and a name of goods requested by the customer;
specifying by the customer a number of redeeming points for a redemption from a price of object goods within a scope of a number of points accumulated by the customer; and
reducing the price of the object goods according to the specification of the customer and a points redeeming ratio defined as a discount from a purchase amount depending on the number of redeeming points.

26. A method of receiving a point-service in an online shopping mall established through a network, comprising the steps of:
specifying by a customer a name of a shop at which a customer is buying goods in the online shopping mall and a name of goods requested by the customer;
specifying by the customer a destination of points issued when the customer buys the specified goods, at a points issue ratio defined as a number of issued points corresponding to a purchase amount; and
in response to the specification, storing in a system for providing a point-service in the online shopping mall points, issued when the customer buys goods, as points accumulated by another customer specified by the destination.

27. A method of providing a point-service in an online shopping mall established through a network, wherein
each shop forming part of the online shopping mall sets each of a points issue ratio defined as a number of issued points corresponding to a purchase amount of a customer and a points redeeming ratio defined as a discount amount from a purchase amount corresponding to a number of redeeming points within a number of points accumulated by the customer to values effective only in a specific period and different from values effective in a period other than the specific period.

28. A method of issuing points in an online shopping mall established through a network, wherein
each shop forming part of the online shopping mall sets a points issue ratio defined as a number of issued points corresponding to a purchase amount of a customer to a variable value depending on a number of points issued when the customer buys goods at shops forming the online shopping mall and unused redeeming points to be used for reducing a purchase amount when the customer next buys goods.

29. A computer-readable storage medium used to direct a computer to perform in realizing a point-service in an online shopping mall established through a network, the functions of:

issuing points depending on a purchase amount of a customer;

storing, for each customer in memory, issued points accumulated by each customer; and reducing payment of a customer as a redemption using the points accumulated by the customer.

30. A method for managing a point-service system for use in an online shopping mall, comprising:

issuing points corresponding to a purchase amount of a customer and a points issue ratio defined as a number of issued points corresponding to the purchase amount of the customer;

storing issued points accumulated by the customer;

redeeming points according to a points redeeming ratio defined as the redemption based on the number of points within a number of the stored accumulated points of the customer and decreasing the number of stored accumulated points of the customer.

* * * * *